US012738288B2

(12) United States Patent
Riedmiller et al.

(10) Patent No.: US 12,738,288 B2
(45) **Date of Patent: *Sep. 15, 2026**

(54) SYSTEM FOR MAINTAINING REVERSIBLE DYNAMIC RANGE CONTROL INFORMATION ASSOCIATED WITH PARAMETRIC AUDIO CODERS

(71) Applicants: DOLBY LABORATORIES LICENSING CORPORATION, San Francisco, CA (US); DOLBY INTERNATIONAL AB, Dublin (IE)

(72) Inventors: Jeffrey Riedmiller, Novato, CA (US); Karl J. Roeden, Solna (SE); Kristofer Kjoerling, Solna (SE); Heiko Purnhagen, Sundbyberg (SE); Vinay Melkote, Bangalore (IN); Leif Sehlstrom, Jarfalla (SE)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 148 days.

This patent is subject to a terminal disclaimer.

(21) Appl. No.: 18/959,199

(22) Filed: Nov. 25, 2024

(65) Prior Publication Data

US 2025/0166648 A1 May 22, 2025

Related U.S. Application Data

(60) Continuation of application No. 18/355,168, filed on Jul. 19, 2023, now Pat. No. 12,175,992, which is a (Continued)

(51) Int. Cl.

*G10L 19/24* (2013.01)
*E21B 21/00* (2006.01)

(Continued)

(52) U.S. Cl.

CPC ............ *G10L 19/24* (2013.01); *E21B 21/003* (2013.01); *E21B 33/138* (2013.01); *E21B 41/00* (2013.01);

(Continued)

(58) Field of Classification Search

CPC ....... G10L 19/008; G10L 19/18; G10L 19/24; G10L 19/167; H03G 3/3005;

(Continued)

(56) References Cited

U.S. PATENT DOCUMENTS 6,785,655 B1 8/2004 Huang
7,072,477 B1 7/2006 Kincaid (Continued)

FOREIGN PATENT DOCUMENTS

CA 2787466 8/2011
CN 101046963 A 10/2007

(Continued)

OTHER PUBLICATIONS

107th MPEG San Jose (CA), USA, Jan. 13-17, 2014, Meeting Report Panos Kudumakis qMedia, Queen Mary University of London https://code.soundsoftware.ac.uk/attachments/download/1094/1PanosSanJose1-07MPEGMeetingReport.pdf (visited Mar. 18, 2018)), pp. 1-8, 8 pages.

(Continued)

*Primary Examiner* — Paul Kim

(57) ABSTRACT

On the basis of a bitstream (P), an n-channel audio signal (X) is reconstructed by deriving an m-channel core signal (Y) and multichannel coding parameters (α) from the bitstream, where 1≤m<n. Also derived from the bitstream are pre-processing dynamic range control, DRC, parameters (DRC2) quantifying an encoder-side dynamic range limiting of the core signal. The n-channel audio signal is obtained by parametric synthesis in accordance with the multichannel (Continued)

coding parameters and while cancelling any encoder-side dynamic range limiting based on the pre-processing DRC parameters.
In particular embodiments, the reconstruction further includes use of compensated post-processing DRC parameters quantifying a potential decoder-side dynamic range compression. Cancellation of an encoder-side range limitation and range compression are preferably performed by different decoder-side components. Cancellation and compression may be coordinated by a DRC pre-processor.

3 Claims, 7 Drawing Sheets

Related U.S. Application Data continuation of application No. 17/201,689, filed on Mar. 15, 2021, now Pat. No. 11,708,741, which is a continuation of application No. 16/720,497, filed on Dec. 19, 2019, now Pat. No. 10,950,252, which is a continuation of application No. 16/514,533, filed on Jul. 17, 2019, now Pat. No. 10,522,163, which is a continuation of application No. 16/222,975, filed on Dec. 17, 2018, now Pat. No. 10,388,296, which is a division of application No. 16/039,608, filed on Jul. 19, 2018, now Pat. No. 10,217,474, which is a continuation of application No. 15/881,393, filed on Jan. 26, 2018, now Pat. No. 10,074,379, which is a division of application No. 15/648,733, filed on Jul. 13, 2017, now Pat. No. 9,881,629, which is a division of application No. 15/178,102, filed on Jun. 9, 2016, now Pat. No. 9,721,578, which is a continuation of application No. 14/399,861, filed as application No. PCT/US2013/039344 on May 2, 2013, now Pat. No. 9,401,152.

(60) Provisional application No. 61/713,005, filed on Oct. 12, 2012, provisional application No. 61/664,507, filed on Jul. 25, 2012, provisional application No. 61/649,036, filed on May 18, 2012.

(51) Int. Cl.

| | |
|---|---|
| ***E21B 33/138*** | (2006.01) |
| ***E21B 41/00*** | (2006.01) |
| ***G10L 19/008*** | (2013.01) |
| ***G10L 19/16*** | (2013.01) |
| ***G10L 19/18*** | (2013.01) |

(52) U.S. Cl.
CPC .......... *G10L 19/008* (2013.01); *G10L 19/167* (2013.01); *G10L 19/18* (2013.01)

(58) Field of Classification Search
CPC ...... H03G 3/3089; H03G 7/002; H03G 7/007; H04S 3/008; H04S 2420/03
USPC ............................................................. 381/2
See application file for complete search history.

(56) References Cited

U.S. PATENT DOCUMENTS

| | | | | |
|---|---|---|---|---|
| 7,369,906 | B2 | 5/2008 | Frindle | |
| 7,729,673 | B2 | 6/2010 | Romesburg | |
| 8,315,396 | B2 | 11/2012 | Schreiner | |
| 8,781,820 | B2 | 7/2014 | Seguin | |
| 8,903,098 | B2 | 12/2014 | Tsuji | |
| 8,965,774 | B2 | 2/2015 | Eppolito | |
| 8,989,884 | B2 | 3/2015 | Guetta | |
| 9,240,763 | B2 | 1/2016 | Baumgarte | |
| 9,294,062 | B2 | 3/2016 | Hatanaka | |
| 9,300,268 | B2 | 3/2016 | Chen | |
| 9,542,952 | B2 | 1/2017 | Hatanaka | |
| 9,576,585 | B2 | 2/2017 | Bleidt | |
| 9,608,588 | B2 | 3/2017 | Baumgarte | |
| 9,633,663 | B2 | 4/2017 | Heuberger | |
| 9,830,915 | B2 | 11/2017 | Schreiner | |
| 9,836,272 | B2 | 12/2017 | Kono | |
| 2007/0063741 | A1 | 3/2007 | Tarango | |
| 2007/0291951 | A1 | 12/2007 | Faller | |
| 2008/0025530 | A1 | 1/2008 | Romesburg | |
| 2009/0164223 | A1 | 6/2009 | Fejzo | |
| 2010/0014692 | A1 | 1/2010 | Schreiner | |
| 2010/0027625 | A1 | 2/2010 | Wik | |
| 2010/0076774 | A1 | 3/2010 | Breebaart | |
| 2010/0135507 | A1 | 6/2010 | Kino | |
| 2010/0223061 | A1 | 9/2010 | Ojanpera | |
| 2010/0286988 | A1* | 11/2010 | Carroll .................. | H03G 9/005 704/E21.001 |
| 2011/0282674 | A1 | 11/2011 | Ojanpera | |
| 2011/0320196 | A1 | 12/2011 | Choo et al. | |
| 2012/0275625 | A1 | 11/2012 | Kono | |
| 2013/0094669 | A1 | 4/2013 | Kono | |
| 2014/0294200 | A1* | 10/2014 | Baumgarte ........... | G10L 19/008 381/107 |
| 2016/0225376 | A1 | 8/2016 | Honma | |
| 2016/0315722 | A1 | 10/2016 | Holman | |
| 2016/0351202 | A1 | 12/2016 | Baumgarte | |
| 2017/0092280 | A1 | 3/2017 | Hirabayashi | |
| 2017/0223429 | A1 | 8/2017 | Schreiner | |

FOREIGN PATENT DOCUMENTS

| | | | |
|---|---|---|---|
| CN | 101048935 | A | 10/2007 |
| CN | 101809656 | | 8/2010 |
| CN | 101872618 | A | 10/2010 |
| CN | 102089813 | | 6/2011 |
| CN | 102203854 | | 9/2011 |
| CN | 101243488 | A | 5/2012 |
| CN | 101410892 | A | 8/2012 |
| CN | 102118668 | A | 10/2014 |
| EP | 0560413 | | 9/1993 |
| EP | 1779385 | | 5/2007 |
| EP | 1852851 | | 11/2007 |
| EP | 3089161 | | 11/2016 |
| GB | 2354139 | A | 1/2004 |
| JP | H10-207499 | A | 8/1998 |
| JP | 2003078428 | | 3/2003 |
| JP | 2007109328 | | 4/2007 |
| JP | 2008505586 | | 2/2008 |
| JP | 2009523259 | | 6/2009 |
| JP | 2009526259 | A | 7/2009 |
| JP | 2009526262 | | 7/2009 |
| JP | 2010508545 | | 3/2010 |
| JP | 2010114803 | | 5/2010 |
| JP | 2011528200 | | 11/2011 |
| JP | 2013519918 | A | 5/2013 |
| JP | 2015517688 | A | 6/2015 |
| KR | 20110050977 | A | 5/2011 |
| WO | 1996032710 | | 10/1996 |
| WO | 2001086638 | | 11/2001 |
| WO | 2004036551 | | 4/2004 |
| WO | 2007120452 | A1 | 10/2007 |
| WO | 2009067741 | | 6/2009 |
| WO | 2010004473 | | 1/2010 |
| WO | 2010125104 | | 11/2010 |
| WO | 2010129808 | | 11/2010 |
| WO | 2011013381 | | 2/2011 |
| WO | 2011100155 | | 8/2011 |
| WO | 2011100155 | A1 | 8/2011 |
| WO | 2011110525 | | 9/2011 |
| WO | 2011131732 | | 10/2011 |
| WO | 2012026092 | | 10/2013 |
| WO | 2014111290 | | 7/2014 |
| WO | 2014160849 | | 10/2014 |
| WO | 2014160895 | | 10/2014 |
| WO | 2015059087 | | 4/2015 |
| WO | 2015088697 | | 6/2015 |

(56) References Cited

FOREIGN PATENT DOCUMENTS

| | | |
|---|---|---|
| WO | 2015144587 | 10/2015 |
| WO | 2015148046 | 10/2015 |
| WO | 2016075053 | 5/2016 |
| WO | 2016193033 | 12/2016 |
| WO | 2016202682 | 12/2016 |
| WO | 2017023423 | 2/2017 |
| WO | 2017023601 | 2/2017 |
| WO | 2017058731 | 4/2017 |
| WO | 2016002738 | 5/2017 |

OTHER PUBLICATIONS

108th MPEG Valencia, Spain, Mar. 31-Apr. 4, 2014, Meeting Report Panos Kudumakis qMedia, Queen Mary University of London https://code.soundsoftware.ac.uk/attachments/download/1119/1PanosValencia-108MPEGMeetingReport.pdf (visited Mar. 18, 2018), pp. 1-9, 9 pages.

Baumgarte, F. "Enhanced Metadata for Dynamic Range Compression" MPEG Meeting, Apr. 2013, ISO/IEC JTC1/SC29/WG11 MPEG2013, pp. 1-10, 10 pages.

Breebaart, J., et al., "Spatial Audio Processing—Ch. 6 MPEG Surround", John Wiley & Sons, Ltd, dated Jan. 1, 2007, pp. 93-115, 16 pages.

Carroll, T. et al. "Audio for Digital Television" published as chapter 5.18 of E.A. Williams et al. NAB Engineering Handbook, 10th Ed. (2007), Academic Press, pp. 309-330, 22 pages.

Kuech, Fabian, "Description of the Fraunhofer IIS Submission For The DRC CFP" 106 MPEG Meeting, Oct. 10-11, 2013, pp. 1-13, 13 pages.

MPEG-2 AAC, Mar. 17, 2001, pp. 1-3, 3 pages.

Pang, Hee-Suk, "Clipping Prevention Scheme for MPEG Surround", ETRI Journal, vol. 30, No. 4, Aug. 1, 2008, pp. 606-608, 3 pages.

Robinson, C. et al., Dynamic Range Control via Metadata 5028 (J-1) An Audio Engineering Society, AES, 107th Convention, Sep. 24-27, 1999, pp. 1-14, 14 pages.

Schmidt, J.C. et al "Multichannel Dynamic Range Compression for Music Signals" May 7-10, 1996, IEEE International Conference on Acoustics, Speech and Signal Processing, pp. 1013-1016, 4 pages.

Schuijers, E. et al "Low Complexity Parametric Stereo Coding" AES presented at the 116th Convention, May 8-11, 2004, Berlin, Germany, pp. 1-11, 11 pages.

* cited by examiner

SYSTEM FOR MAINTAINING REVERSIBLE DYNAMIC RANGE CONTROL INFORMATION ASSOCIATED WITH PARAMETRIC AUDIO CODERS

CROSS-REFERENCE TO RELATED APPLICATIONS

This application is a continuation of U.S. patent application Ser. No. 18/355,168, filed Jul. 19, 2023, which is a continuation of U.S. patent application Ser. No. 17/201,689 (now U.S. Pat. No. 11,708,741), filed Mar. 15, 2021, which is a continuation of U.S. patent application Ser. No. 16/720,497 (now U.S. Pat. No. 10,950,252), filed Dec. 19, 2019, which is a continuation of U.S. patent application Ser. No. 16/514,533 (now U.S. Pat. No. 10,522,163), filed Jul. 17, 2019, which is a continuation of U.S. patent application Ser. No. 16/222,975 (now U.S. Pat. No. 10,388,296), filed Dec. 17, 2018, which is a divisional of U.S. patent application Ser. No. 16/039,608 (now U.S. Pat. No. 10,217,474), filed Jul. 19, 2018, which is a continuation of U.S. patent application Ser. No. 15/881,393 (now U.S. Pat. No. 10,074,379), filed Jan. 26, 2018, which is a divisional of U.S. patent application Ser. No. 15/648,733 (now U.S. Pat. No. 9,881,629), filed Jul. 13, 2017, which is a divisional of U.S. patent application Ser. No. 15/178,102 (now U.S. Pat. No. 9,721,578), filed Jun. 9, 2016, which is a continuation of U.S. patent application Ser. No. 14/399,861 (now U.S. Pat. No. 9,401,152), filed Nov. 7, 2014 which in turn is the 371 national stage of PCT Application No. PCT/US2013/039344, filed May 2, 2013. PCT Application No. PCT/US2013/039344 claims priority to U.S. Provisional Patent Application No. 61/649,036 filed May 18, 2012, U.S. Provisional Patent Application No. 61/664,507, filed Jul. 25, 2012 and U.S. Provisional Patent Application No. 61/713,005, filed Oct. 12, 2012, each of which is hereby incorporated by reference in its entirety.

TECHNICAL FIELD

The invention disclosed herein generally relates to audiovisual media distribution. In particular, it relates to an adaptive distribution format enabling both a higher-bitrate and a lower-bitrate mode as well as seamless mode transitions during decoding. The invention further relates to methods and devices for encoding and decoding signals in accordance with the distribution format.

BACKGROUND

Parametric stereo and multichannel coding methods are known to be scalable and efficient in terms of listening quality, which makes them particularly attractive in low bitrate applications. In cases where the bitrate limitations are of a transitory nature (e.g., network jitter, load variations), however, the full benefit of the available network resources may be obtained through the use of an adaptive distribution format, wherein a relatively higher bitrate is used during normal conditions and a lower bitrate when the network functions poorly.

Existing adaptive distribution formats and the associated (de) coding techniques may be improved from the point of view of their bandwidth efficiency, computational efficiency, error resilience, algorithmic delay and further, in audiovisual media distribution, as to how noticeable a bitrate switching event is to a person enjoying the decoded media. The fact that legacy decoders can be expected to remain in use parallel to newer, dedicated equipment poses a limitation on such potential improvements insofar as backward compatibility must be maintained.

Dynamic range control (DRC) techniques for ensuring a more consistent dynamic range during playback of an audiovisual signal are well known in the art. For an overview, see T. Carroll and J. Riedmiller, "Audio for Digital Television", published as chapter 5.18 of E. A. Williams et al. (eds.), *NAB Engineering Handbook,* 10$^{th}$ ed. (2007), Academic Press, and references cited therein. Such techniques may enable a receiver to adapt the dynamic range of an audiovisual signal to suit relatively unsophisticated playback equipment, while the signal itself is broadcast at full dynamic range, to the benefit of more refined equipment. A simple implementation of DRC may use a metadata field encoding a gain factor in the interval from 0 to 1, which the decoder may choose to apply or not.

Using known DRC techniques an encoded audiovisual signal may be transmitted together with metadata offering a user the capability of compressing or boosting the playback dynamic range to suit his or her preferences or manually adapting the dynamic range to the available playback equipment. However, known DRC techniques may not be compatible with adaptive bitrate coding methods, and switching between two bitrates may sometimes be accompanied by dynamic range inconsistencies, especially in legacy equipment. The present invention addresses this concern.

BRIEF DESCRIPTION OF THE DRAWINGS

Embodiments of the invention will now be described with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION

I. Overview

Figure 1A:
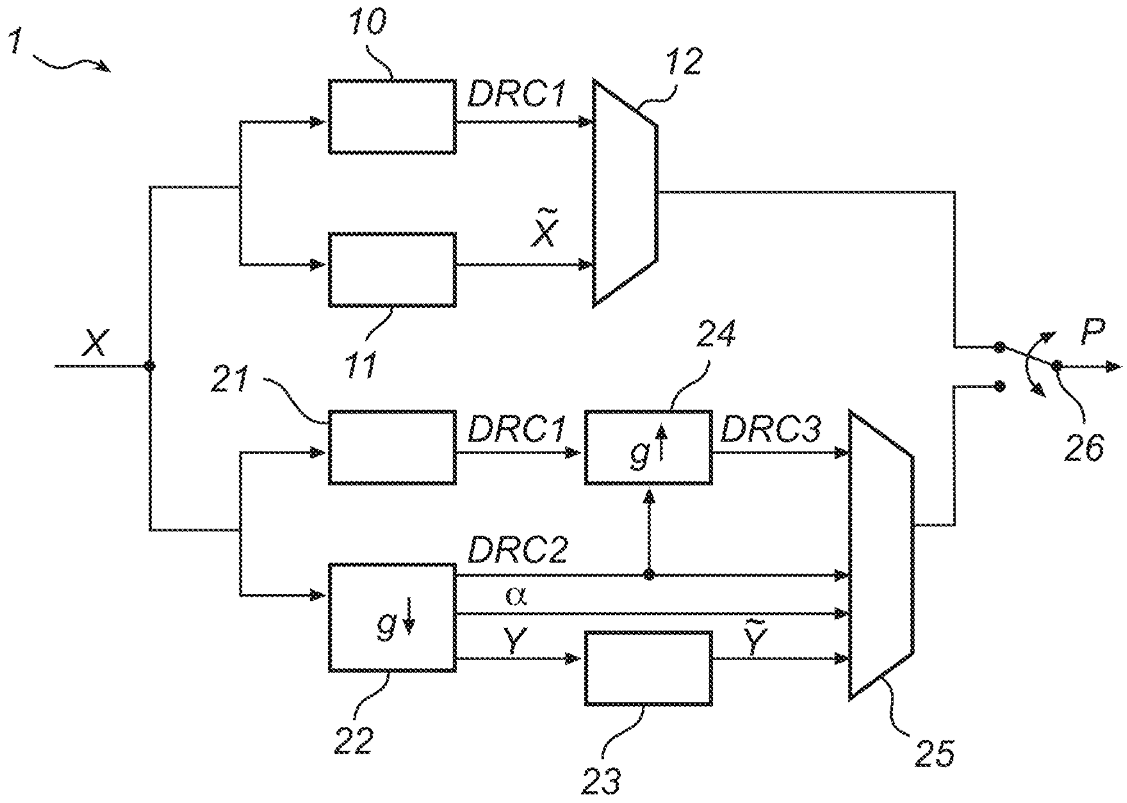
FIGS. 1A, 1B, 3, 7 and 10 are generalized block diagrams of audio encoding systems according to example embodiments of the invention.

As used herein, an "audio signal" may be a pure audio signal or an audio part of an audiovisual signal or multimedia signal.

An example embodiment of the present invention proposes methods and devices enabling distribution of audiovisual media in a bandwidth-economical manner. In particular, an example embodiment proposes a coding format for audiovisual media distribution that allows both legacy receivers and more recent equipment to output an audio portion having a consistent dialogue level. In particular, an example embodiment proposes a coding format with adaptive bitrate, wherein a switching between two bitrate values need not be accompanied by a sharp dialogue level change, which may otherwise be a perceptible artefact in the audio signal or the audio portion of the signal during playback.

An example embodiment of the invention provides an encoding method, encoder, decoding method, decoder, computer-program product and a media coding format with the features set forth in the independent claims.

A first example embodiment of the invention provides a decoding system for reconstructing an n-channel audio signal X on the basis of a bitstream P. The decoding system is operable at least in a parametric coding mode and comprises:

- a demultiplexer for receiving the bitstream and outputting an encoded core signal $\tilde{Y}$ and one or more multichannel coding parameters, which is/are collectively denoted by $\alpha$;
- a core signal decoder for receiving the encoded core signal and outputting an m-channel core signal, where $1 \leq m < n$;
- a parametric synthesis stage for receiving the core signal and the multichannel coding parameters and outputting the n-channel signal, by forming a linear combination of the channels of the core signal using gains depending from the multichannel coding parameters.

In this first example embodiment, the bitstream further comprises one or more pre-processing DRC parameters DRC2, which quantitatively characterize a dynamic range limiting operation having been performed in an encoder producing the bitstream. Based on the pre-processing DRC parameters, the decoding system is operable to cancel the encoder-side dynamic range limiting. Preferably, the signals are partitioned into time blocks and the pre-processing DRC parameters DRC2 are defined with a resolution of one time block of the signal; as such, each value of the parameters DRC2 applies to at least one time block, and it is possible to associate each time block with a particular value that is specific to that time block. Still without departing from the scope of the invention, the values of the parameters DRC2 may be constant for several consecutive blocks. For instance, the value of the parameters DRC2 may be updated only once every time frame, which comprises a plurality of time blocks, over which, therefore, the parameters DRC2 are constant.

An advantage associated with the first example embodiment is that pre-processing DRC parameters DRC2 offers the decoding system the option of restoring the audio signal to its original dynamic range in such time intervals where the encoder, for whatever reason, has performed dynamic range limiting (or compression). The restoration may amount to cancelling the dynamic range limitation, that is, to increasing (or boosting) the dynamic range. One possible reason for limiting a dynamic range in the encoder may be to avoid clipping. Whether restoration is to be applied or not may for instance depend on manually entered user input, automatically detected properties of playback equipment, a target DRC level obtained from an external source or further factors. The target DRC level may express a fraction of the original post-processing dynamic range control (quantified by the post-processing DRC parameters DRC1) which is to be applied by the decoding system. It may be expressed by a parameter $f \in [0,1]$ which modifies the amount of DRC to be applied from DRC1 into f×DRC1 (in logarithmic units).

In a simple implementation, the DRC2 parameter may be encoded in the form of a broad-spectrum (or broadband) gain factor represented in logarithmic form as a positive dB value, which quantifies the relative amplitude decrease that the signal has already undergone. Hence, supposing DRC2=x>0, the relative amplitude change on the encoder side was $10^{-x/20}<1$, so that the cancelling may then consist in scaling the signal by $10^{+x/20}>1$ on the decoder side.

The actual cancelling may be full or partial, depending on a target DRC level and on the input DRC level (or decoder-input DRC level), namely the DRC level that the n-channel audio signal will have after reconstruction in the absence of any dynamic range compression or dynamic range boosting. The input DRC level may be the original dynamic range reduced by an amount corresponding to the pre-processing DRC parameters DRC2. The target DRC level may be the original dynamic range reduced by an amount corresponding to the product of the parameter f and the post-processing DRC parameters DRC1, that is, f×DRC1 (in logarithmic units). In the simple implementation referred to previously, the condition f×DRC1<DRC2 may imply a partial cancelling, i.e., by an amount corresponding to DRC2−f×DRC1 rather than DRC2. For example, if the target DRC level corresponds to the input DRC level (e.g., the dynamic range of the audio signal originally encoded by the encoder producing the bitstream), which may be expressed as f=0, then full cancelling is required, by an amount DRC2. If the target DRC level is less than the input DRC level, as is the case when 0<f<1 and f×DRC1<DRC2, it is sufficient to partially cancel the dynamic range limiting. If the target DRC level is greater than the input DRC level, as per f×DRC1>DRC2, the specified DRC level may be achieved by performing further dynamic range compression in the decoder, namely by an amount corresponding to f×DRC1−DRC2. In this case, it is not necessary to cancel the pre-processing DRC initially. Finally, if the target DRC level is the full DRC amount quantified by DRC1, as expressed by f=1, then it depends on whether DRC1<DRC2 or DRC1>DRC2, whether partial cancellation of the encoder-side dynamic range limiting or further compression is to be performed.

In a second example embodiment, there is provided a method for reconstruction of an n-channel audio signal X on the basis of a bitstream. According to the method, receipt of a bitstream that contains each of an encoded core signal $\tilde{Y}$, one or more multichannel coding parameters $\alpha$ and pre-processing DRC parameters DRC2 (as defined above) triggers the following actions:

- the encoded core signal is decoded into an m-channel core signal Y, where $1 \leq m < n$;
- a parametric spatial synthesis is performed, so that the n-channel signal is reconstructed based on the core signal and the multichannel coding parameters.

According to the second example embodiment, the decoding includes cancelling the encoder-side dynamic range limiting based on the parameters DRC2.

The first and second example embodiments are functionally similar and generally share the same advantages.

In a further development of the first example embodiment, the decoding system further receives, as part of the bitstream and still when the system is in the parametric coding mode, one or more compensated post-processing DRC parameters DRC3, which quantify a DRC that may be applied by the decoder. The application of the DRC may be subject to manual user input, automatically detected properties of the playback equipment or the like; as such, the DRC to be applied by the decoder may be effectuated completely, partially or not at all. Generally speaking, the pre-processing DRC parameters DRC2 are useful for boosting the dynamic range in relation to the input DRC level, whereas the compensated post-processing DRC parameters DRC3 are useful for making any adjustment to the dynamic range from the input DRC level, including range compression as well. The DRC3 parameters may be represented in logarithmic form as a positive or negative dB value. Hence, supposing DRC3=y>0, the relative amplitude change to be effected on the decoder side is proportional to $10^{-y/20}$, which is a scalar in the interval (0,1). Conversely, a negative value of DRC3 will cause an upscaling on the decoder side.

In a further development of the above, the decoding system includes a DRC processor operable to cancel the encoder-side dynamic range compression based on the parameter DRC2. Optionally, the DRC processor is operable to cancel a fraction of the dynamic range compression which has been applied on the encoder side, as expressed by the parameter f discussed above.

In a further development, the decoding system further includes a DRC pre-processor controlling the DRC processor and the core signal decoder and being responsible for achieving a target DRC level. As such, the DRC pre-processor may determine whether the target DRC level (e.g., f×DRC1) is greater or less than the input DRC level, which may be the dynamic range of the audio signal originally encoded and then reduced by the encoder-side DRC quantified by the pre-processing DRC parameter DRC2. If, based on the outcome of this determination, the decoded audio signal needs to be boosted, the DRC pre-processor (i) instructs the DRC processor to partially or completely cancel the encoder-side dynamic range limiting. If instead the decoded audio signal needs to be compressed (e.g., f×DRC1>DRC2), the DRC pre-processor instructs the DRC processor to (ii) partially or completely effectuate the decoder-side DRC to be applied, as quantified by the parameters DRC3. If the target DRC level does not differ significantly from the input DRC level (e.g., f×DRC1≈DRC2), the DRC pre-processor need not take any action. In normal operation, both operations (i) and (ii) are not performed in respect of the same time block.

In an example embodiment, the decoding system is further operable in a discrete decoding mode, for reconstructing the audio signal on the basis of a bitstream containing an encoded n-channel signal $\tilde{X}$. Hence, this embodiment provides a dual-mode or multiple-mode decoding system. From the point of view of adaptive coding, the discrete coding mode may represent a high-bitrate mode, while the parametric coding mode typically corresponds to a lower-bitrate mode.

In an example embodiment, the decoding system is of a dual-mode type, that is, it may operate in a parametric coding mode or a discrete coding mode. The decoding system is enabled to apply decoder-side DRC in each of these modes. In the discrete coding mode, the decoding system uses post-processing DRC parameters DRC1 as guidance for the DRC. In the parametric coding mode, however, the n-channel audio signal is generated on the basis of a core signal which has potentially been derived in connection with dynamic range limiting on the encoder side, at least in some time blocks. To account for the dynamic range change having already taken place (i.e., the dynamic range limiting in some time blocks), the decoding system uses compensated post-processing DRC parameters DRC3 as guidance for the DRC. Both the parameters DRC1 and DRC3 are derivable from the bitstream, but during normal operation of the system, not both but only either of the parameter types is derivable in a given time block. Including both parameters DRC1 and DRC3 would amount to sending redundant information when the parameters DRC2 are present. The decoding system of this example embodiment uses the parameter DRC2 either to adapt the parameter DRC1 to the scale of the parameter DRC3 or to adapt the parameter DRC3 to the scale of the parameter DRC1. For example, the decoding system may include a DRC down-compensator which receives the parameters DRC2 and DRC3 and outputs, based thereon, restored post-processing DRC parameters to be applied by the decoder system. The restored post-processing DRC parameters will then be comparable with (on the same scale as) the post-processing DRC parameters DRC1. Put differently, the decoder-side DRC expressed by the restored DRC parameters is quantitatively equivalent to the combination of the encoder-side dynamic range limiting of the core signal and the decoder-side DRC expressed by the compensated post-processing DRC parameters DRC3. In the simple implementation referred to above, the relationship between the respective DRC parameters may be as follows: the restored DRC parameters are obtained as DRC2+DRC3, which is equal to DRC1.

In a second aspect of the invention, an example embodiment provides an encoding system for encoding an n-channel audio signal X partitioned into time blocks as a bitstream P. The encoding system comprises:

a parametric analysis stage for receiving the n-channel signal and outputting, based thereon and in a parametric coding mode of the encoding system, an m-channel core signal Y and one or more multichannel coding parameters α, where 1≤m<n; and a core signal encoder for receiving the core signal and outputting an encoded core signal $\hat{Y}$.

In the encoding system, the parametric analysis stage is configured to perform adaptive dynamic range limiting on a time-segment basis and to output pre-processing DRC parameters DRC2 quantifying the dynamic range limiting applied. The time segment may be one time block or a plurality of consecutive time blocks, such as time frame comprising six time blocks. The encoding system is configured to transmit the pre-processing DRC parameters DRC2 jointly with the bitstream, preferably but not necessarily as a part thereof. By transmitting the pre-processing DRC parameters DRC2, the encoding system allows a decoding system receiving the bitstream to cancel the dynamic range limiting which the parametric analysis stage has imposed on the core signal. If the dynamic range limiting is performed on a time-block basis, the parameters DRC2 have time-block resolution. Alternatively, if the dynamic range limiting is performed on a frame basis, the parameters DRC2 have a resolution of one frame. Put differently, each time block is associated with a specific value the of parameters DRC2 or with a reference to a previously defined value, but this value may be updated either on a frame basis or a block basis. Further, the dynamic range limiting in the parametric analysis stage may be performed directly on the core signal (e.g., by applying dynamic range limiting on the core signal) or indirectly (e.g., by applying dynamic range limitation on a signal from which the core signal is derived).

According to a further development of the preceding example embodiment, the encoding system is operable in both a parametric coding mode and a discrete coding mode. To enable DRC on the decoder side, the encoder is configured to derive one or more post-processing DRC parameters DRC1 quantifying a decoder-side DRC to be applied. The parameters DRC1 are output in the discrete coding mode. In the parametric coding mode, however, the parameters DRC1 are compensated so as to account for any dynamic range limiting that has already been performed by the parametric analysis stage. The output of this compensation process includes compensated post-processing DRC parameters DRC3. The guiding principle of the compensation process may be that the decoder-side DRC expressed by the post-processing DRC parameters is to be quantitatively equivalent to the combination of the dynamic range limiting applied by the parametric analysis stage (as quantified by parameters DRC2) and the decoder-side DRC (as quantified by the compensated post-processing DRC parameters DRC3). Preferably, all three parameter types are expressed on compatible scales, e.g., by using corresponding linear or logarithmic units. In the simple implementation referred to above, the relationship between the DRC parameters may be as follows (still on a logarithmic scale): the compensated post-processing DRC parameters are obtained as DRC1−DRC2.

In a further example embodiment within the second aspect, an encoding method includes:

- receiving an n-channel audio signal X partitioned into time blocks;
- generating an m-channel core signal Y and one or more multichannel coding parameters α, while performing dynamic-range limiting on a time-block basis and generating one or more pre-processing DRC parameters DRC2, which quantify the dynamic-range limiting applied; and
- outputting a bitstream P containing the core signal, the multichannel coding parameters and the pre-processing DRC parameters DRC2.

In a further example embodiment, the invention provides a computer-program product comprising a computer-readable medium with computer-executable instructions for performing a decoding method or an encoding method in accordance with example embodiments described above. The computer-program product may be executed in a general-purpose computer, which does not necessarily include dedicated hardware components.

In a still further example embodiment, the invention provides a data structure for storage or transmission of an audio signal. The structure includes an m-channel core signal Y, one or more mixing parameters α and one or more pre-processing DRC parameters DRC2 quantifying an encoder-side dynamic-range limiting. The structure is susceptible of decoding by way of an n-channel linear combination of the downmix signal channels (and possibly, of channels in a decorrelated signal), wherein said one or more mixing parameters control at least one gain in the linear combination, and by cancelling the encoder-side dynamic range limiting. In particular, the invention provides a computer-readable medium storing information structured in accordance with the above data structure. In the data structure, the pre-processing DRC parameters DRC2 may be encoded as a 3-bit field representing an exponent and an associated 4-bit field representing a mantissa; at decoding the exponent and mantissa are combined into a scalar value corresponding to a gain value. Alternatively, the pre-processing DRC parameters DRC2 may be encoded as a 2-bit field representing an exponent and an associated 5-bit field representing a mantissa.

Further example embodiments are defined in the dependent claims. It is noted that the invention relates to all combinations of features, even if recited in mutually different claims.

II. Example Embodiments: Encoding Side

FIG. 1*a* shows, in generalized block-diagram form, a dual-mode encoding system 1 in accordance with an example embodiment. An n-channel audio signal X is provided to each of an upper portion, which is active at least in a discrete coding mode of the encoding system 1, and a lower portion, which is active at least in a parametric coding mode of the system 1.

The upper portion generally consists of a discrete-mode DRC analyzer 10 arranged in parallel with an encoder 11, both of which receive the audio signal X as input. Based on this signal, the encoder 11 outputs an encoded n-channel signal $\tilde{X}$, whereas the DRC analyzer 10 outputs one or more post-processing DRC parameters DRC1 quantifying a decoder-side DRC to be applied. The parallel outputs from both units 10, 11 are gathered by a discrete-mode multiplexer 12, which outputs a bitstream P.

The lower portion of the encoding system 1 comprises a parametric analysis stage 22 arranged in parallel with a parametric-mode DRC analyzer 21 receiving, as the parametric analysis stage 22, the n-channel audio signal X. Based on the n-channel audio signal X, the parametric analysis stage 22 outputs one or more multichannel coding parameters, collectively denoted by α, and an m-channel ($1 \le m < n$) core signal Y, which is next processed by a core signal encoder 23, which outputs, based thereon, an encoded core signal $\tilde{Y}$. As suggested by the notation g↓, the parametric analysis stage 22 effects a dynamic range limiting in time blocks where this is required. A possible condition controlling when to apply dynamic range limiting may be a 'non-clip condition' or an 'in-range condition', implying, in time segments where the core signal has high amplitude, that the signal is processed so that it fits within the defined range. The condition may be enforced on the basis of one time block or a time frame comprising several time blocks. Preferably, the condition is enforced by applying a broad-spectrum gain reduction rather than truncating only peak values or using similar approaches. As is well known per se in the art, there exist techniques for rendering a temporary dynamic range limiting operation less noticeable, if the limiting is only required for a specific set of time blocks, such as by applying and/or releasing the limiting gradually. In particular, the system 1 may comprise a feedback loop (not shown) configured to smooth DRC parameters. For instance, a current parameter value to be output may be obtained as the sum of a fraction $0<a<1$ of the parameter value of the previous segment and a fraction $(1-a)$ of a parameter value resulting from the enforcement of the 'non-clip condition' in the current segment. Post-processing DRC parameters DRC1 and pre-processing DRC parameters DRC2 may of course be smoothed independently and with different values of the constant a.

Figure 5:
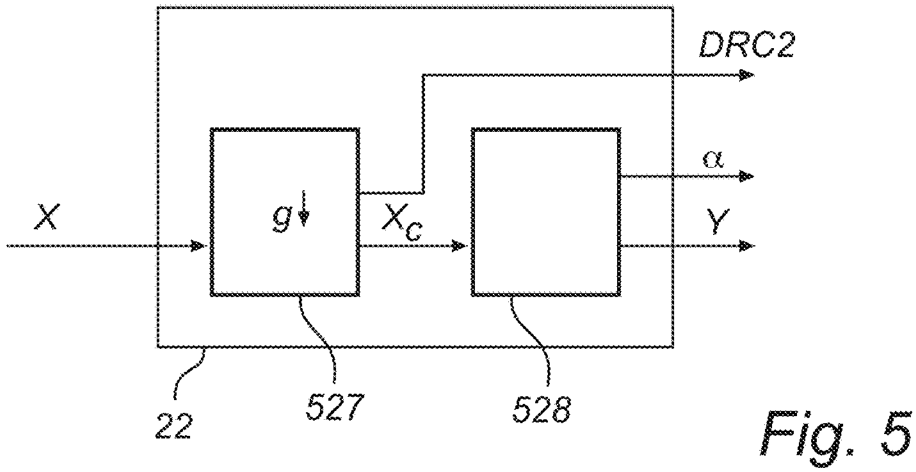
FIG. 5 shows a portion of a parametric analysis stage in an audio encoding system.

FIG. 5 shows a possible implementation of the parametric analysis stage 22, which comprises a pre-processor 527 and a parametric analysis processor 528. The pre-processor 527 is responsible for performing the dynamic range limiting on the n-channel signal X, whereby it outputs a dynamic range limited n-channel signal $X_C$, which is supplied to the parametric analysis processor 528. The pre-processor 527 further outputs a block- or frame-wise value of the pre-processing DRC parameters DRC2. Together with multichannel coding parameters α and an m-channel core signal Y from the parametric analysis processor 528, the parameters DRC2 are included in the output from the parametric analysis stage 22.

With reference again to FIG. 1*a*, it is noted that the discrete-mode DRC analyzer 10 functions similarly to the parametric-mode DRC analyzer 21 in that it outputs one or more post-processing DRC parameters DRC1 quantifying a decoder-side to be applied. The parameters DRC1 provided by the parametric-mode DRC analyzer 21 are however not to be included in the bitstream in the parametric coding mode, but instead undergo compensation so that the dynamic range limiting carried out by the parametric analysis stage 22 is accounted for. For this purpose, a DRC up-compensator 24 receives the post-processing DRC parameters DRC1 and the pre-processing DRC parameters DRC2. For each time block, the DRC up-compensator 24 derives a value of one or more compensated post-processing DRC parameters DRC3, which are such that the combined action of the compensated post-processing DRC parameters DRC3 and the pre-processing DRC parameters DRC2 is quantitatively equivalent to the DRC quantified by the post-processing DRC parameters DRC1. Put differently, the DRC up-compensator 24 is configured to reduce the post-processing DRC parameters output by the DRC analyzer 21 by that share of it (if any) which has already been effected by the parametric analysis stage 22. It is the compensated post-processing DRC parameters DRC3 that are to be included in the bitstream. Still referring to the lower portion of the system 1, a parametric-mode multiplexer 25 collects the compensated post-processing DRC parameters DRC3, the pre-processing DRC parameters DRC2, the multichannel coding parameters α and the encoded core signal $\tilde{Y}$ and forms, based thereon, a bitstream P. In a possible implementation, the compensated post-processing DRC parameters DRC3 and the pre-processing DRC parameters DRC2 may be encoded in logarithmic form as dB values influencing an amplitude upscaling or downscaling on the decoder side. The compensated post-processing DRC parameters DRC3 may have any sign. However, the pre-processing DRC parameters DRC2, which result from enforcement of a 'non-clip condition' or the like, will be represented by a non-negative dB value at all times.

Common to both the upper and lower portion of the encoding system 1, a selector 26 (symbolizing any hardware- or software-implemented signal selection means) determines, depending on the actual coding mode, whether the bitstream from the upper or the lower portion of the encoding system 1 is to constitute the final output from the encoding system 1. Similarly, there may be provided a switch (not shown in FIG. 1*a*) on the input side of the system 1 for directing the audio signal X either to the upper or the lower portion of the system 1. The input-side switch may be actuated in correspondence with the output-side switch 26.

With reference to FIG. 1*a* as well as the figures to be discussed below, the bitstream P may be encoded in a format conforming to Dolby Digital Plus (DD+ or E-AC-3, Enhanced AC-3). The bitstream then includes at least metadata fields dynrng and compr. According to one specification of DD+, dyning has a resolution of one time block, whereas compr has a resolution of one frame, which comprises four or six time blocks. With regard to the significance of these metadata fields, the post-processing DRC parameters DRC1 defined above corresponds to either dynrng or compr, depending on, e.g., whether "heavy compression" is activated, which functions in a way which assures that a monophonic downmix will not exceed a certain peak level. In normal circumstances both the dynrng and the compr fields are transmitted, and it is a matter for the decoder to decide which one to use. Hence, the post-processing DRC parameters DRC1, which may therefore have either block-wise or frame-wise resolution, can be transmitted in legacy portions of the format and will be understood by legacy decoders. However, the pre-processing DRC parameters DRC2 lack a counterpart in the DD+ format and are preferably encoded in a new metadata field. It is recalled that the pre-processing DRC parameters DRC2 relate to the part of dynrng and/or compr that ensures that the signal will not clip when it is downmixed from 5.1 format (n=6) to stereo format (m=2). The compensated post-processing DRC parameters DRC3 is the result after compensating the dynrng or compr value by deducting the clip prevention quantified by the pre-processing DRC parameters DRC2; it may therefore be transmitted in the dynrng or compr field in the DD+ bitstream.

The new metadata field for the pre-processing DRC parameters DRC2 may include 7 bits (xxyyyyy), where the bits in the x positions represent an integer in [0, 3] and the bits in the y positions represents an integer in [0, 31]. The pre-processing DRC parameter DRC2 is obtained as gain factor $(1+y/32)\times 2^x$.

A further metadata parameter in the DD+ format is dialnorm, which is a (possibly time-averaged) loudness level of the content. In example embodiments, the target output reference level $L_T$ is a setting in the decoder configuration, possibly controlled by the user. To achieve the target output reference level $L_T$, a decoding system is to apply a static attenuation quantified by the difference dialnorm$-L_T$. To obtain the total attenuation to be applied, the decoding system is to augment this difference by any additional attenuation stipulated by (non-compensated) post-processing DRC parameters DRC1 or compensated post-processing DRC parameters DRC3 or a target DRC expressed as a fraction f×DRC1 of the post-processing DRC parameters. This yields: dialnorm$-L_T$+DRC1 or dialnorm$-L_T$+DRC3 or dialnorm$-L_T$+f×DRC1, respectively. If one of these three linear combinations is of positive sign, it stipulates that a non-zero amount of total attenuation is to be applied in the decoding system; a negative sign stipulates that the signal is effectively to be boosted.

Figure 7:
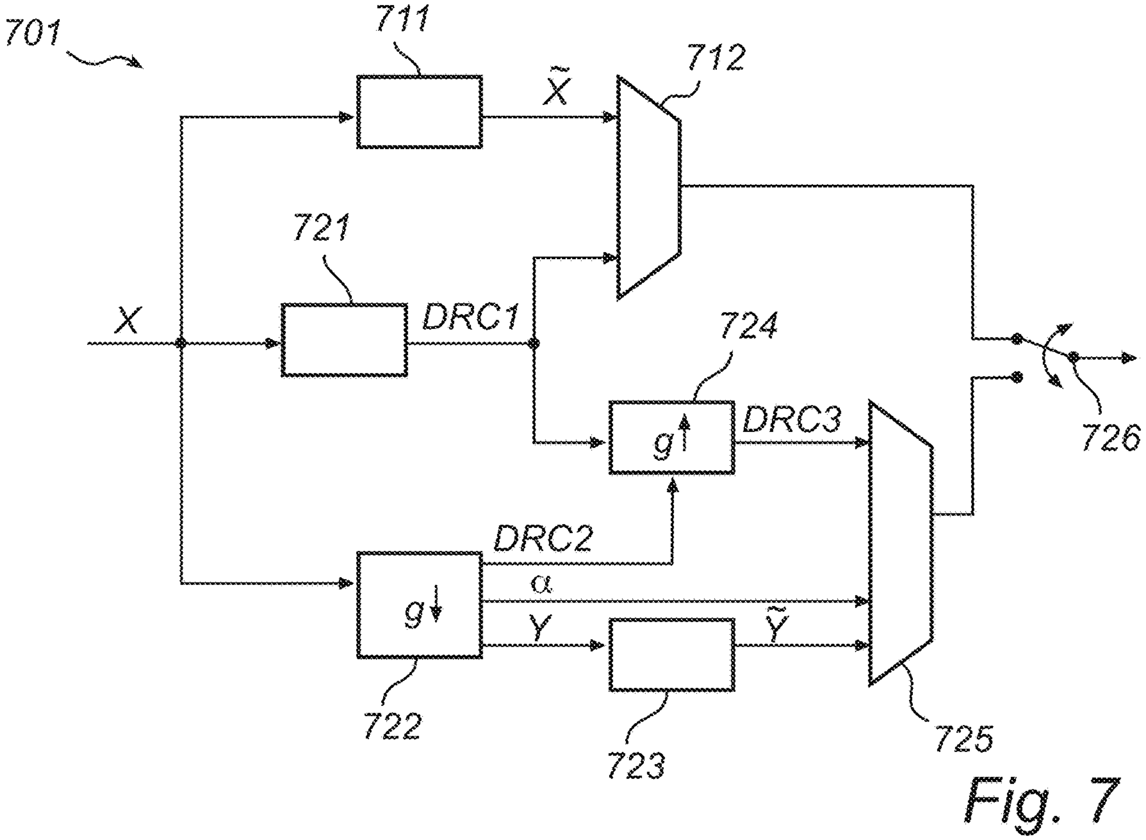

FIG. 7 shows, according to a further example embodiment, an encoding system 701 functioning similarly to the encoding system 1 shown in FIG. 1*a*. Because analogous reference symbols have been used and the notation relating to the signals is consistent with the one of FIG. 1*a*, it is believed that no detailed description of the working principles of the encoding system 701 is necessary. One important difference however lies in the fact that one DRC analyzer 721 fulfils the tasks of both the discrete-mode DRC analyzer 10 and the parametric-mode DRC analyzer 21 in FIG. 1*a*. For this purpose, the DRC analyzer 721 receives the n-channel audio signal X to be encoded by the encoding system 701; it supplies post-processing DRC parameters DRC1, which it generates on the basis of the n-channel audio signal X, to both a discrete-mode multiplexer 712 and a DRC up-compensator 724, wherein the latter component is functionally equivalent to the DRC up-compensator 24 in the encoding system 1 of FIG. 1*a*.

Figure 3:
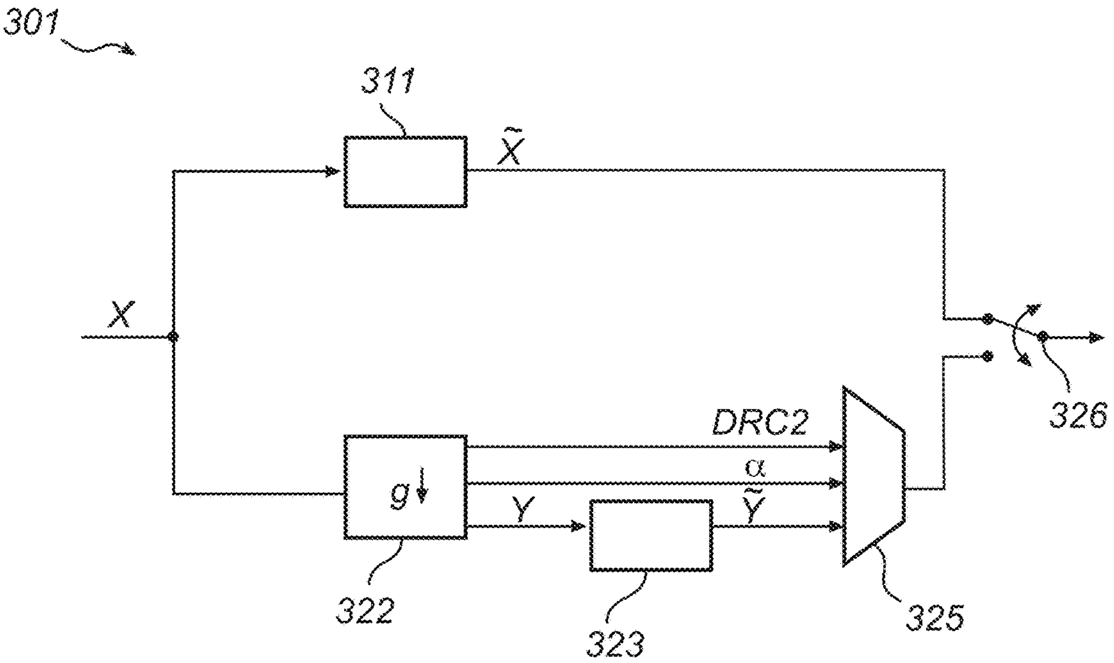

FIG. 3 shows an encoding system 301, which is relatively simpler than the one in FIG. 1*a* insofar as it does not produce any post-processing DRC parameters as output. As such, a decoder receiving a bitstream P produced by the encoding system 301 will not necessarily be capable of performing dynamic range compression. Such a decoder will, however, be capable of cancelling any dynamic range limiting applied by the encoding system 301; typically, this amounts to boosting the dynamic range in time blocks where the n-channel audio signal X includes peaks of relatively high amplitude.

In FIG. 3, the upper portion of the encoding system 301, which is active at least in the discrete coding mode of the encoding system 301, need not include more than an encoder 311 configured to provide an encoded n-channel signal $\tilde{X}$ on the basis of the n-channel signal X to be encoded by the system 301. The lower portion, corresponding to a discrete coding mode, comprises fewer components than the analogous portion of the encoding system in FIG. 1*a*, namely, a parametric analysis stage 322 outputting, based on the n-channel audio signal X, pre-processing DRC parameters DRC2, multichannel coding parameters α and an m-channel core signal Y. After the core signal Y has been processed in a core signal encoder 323, which transforms it into an encoded core signal Ŷ, the set of outputs from the parametric analysis stage 322 is combined into a bitstream P by a parametric-mode multiplexer 325. A selector 326 arranged downstream of both the upper and lower portions of the encoding system 301 is responsible for outputting the bitstream produced by either of the upper and lower portion, in dependence of the current coding mode of the encoding system 301.

Figure 10:
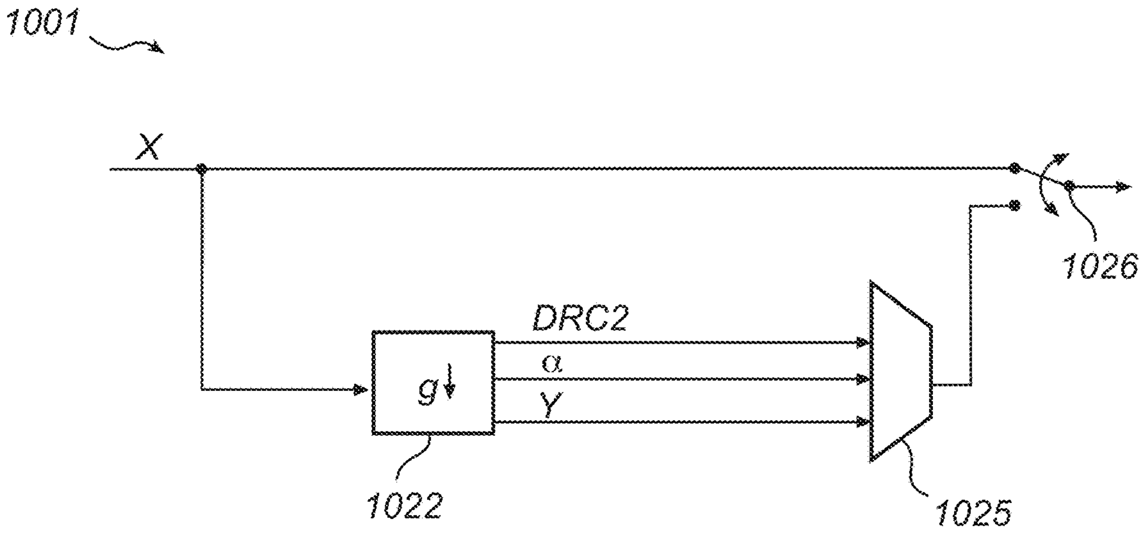

An encoding system 1001 shown in FIG. 10 represents a further simplification. This encoding system 1001 is adapted to process an n-channel audio signal X which is in a format suitable for storage or transport without any further encoding operation. In the discrete coding mode, therefore, the audio signal X may be output from the encoding system 1001 without any further processing, as illustrated by the position of selector 1026 shown in FIG. 10. In the parametric coding mode, a parametric analysis stage 1022 analyzes the n-channel audio signal X to output pre-processing DRC parameters DRC2, multichannel coding parameters α and an m-channel core signal Y. The parametric analysis stage 1022 is configured to operate on the n-channel audio signal also when this, as stated, is in a format suitable for transport or storage. In the encoding system 1001 of FIG. 10, the core signal Y is also in a transport- or storage-enabled format, so that this signal, together with the multichannel coding parameters α and the parameters DRC2 may be combined by a parametric-mode multiplexer 1025 into a bitstream to be output from the encoding system 1001 in the parametric coding mode.

Figure 1B:
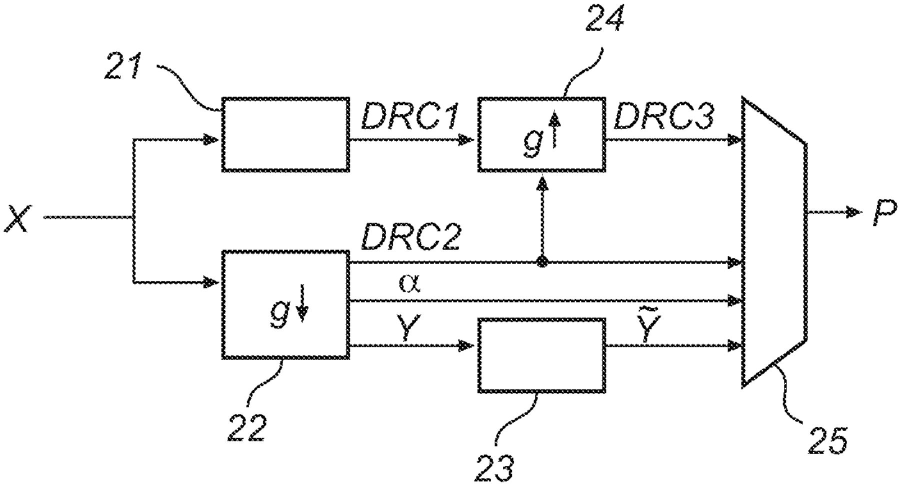

FIG. 1*b* illustrates a single-mode encoding system in accordance with an example embodiment. An n-channel audio signal X is provided to a DRC analyzer 21 and a parametric analysis stage 22, which are arranged in parallel. Based on the n-channel audio signal X, the parametric analysis stage 22 outputs one or more multichannel coding parameters, collectively denoted by a, and an m-channel (1≤m<n) core signal Y, which is next processed by a core signal encoder 23, which outputs, based thereon, an encoded core signal Ỹ. The parametric analysis stage 22 effects a dynamic range limiting in time blocks where this is required. A DRC up-compensator 24 receives the post-processing DRC parameters DRC1 and the pre-processing DRC parameters DRC2. For each time block (in this example, the resolution at which values of the post-processing DRC parameters DRC1 are generated is one time block) the DRC up-compensator 24 derives a value of one or more compensated post-processing DRC parameters DRC3, which are such that the combined action of the compensated post-processing DRC parameters DRC3 and the pre-processing DRC parameters DRC2 is quantitatively equivalent to the DRC quantified by the post-processing DRC parameters DRC1.

Figure 8:
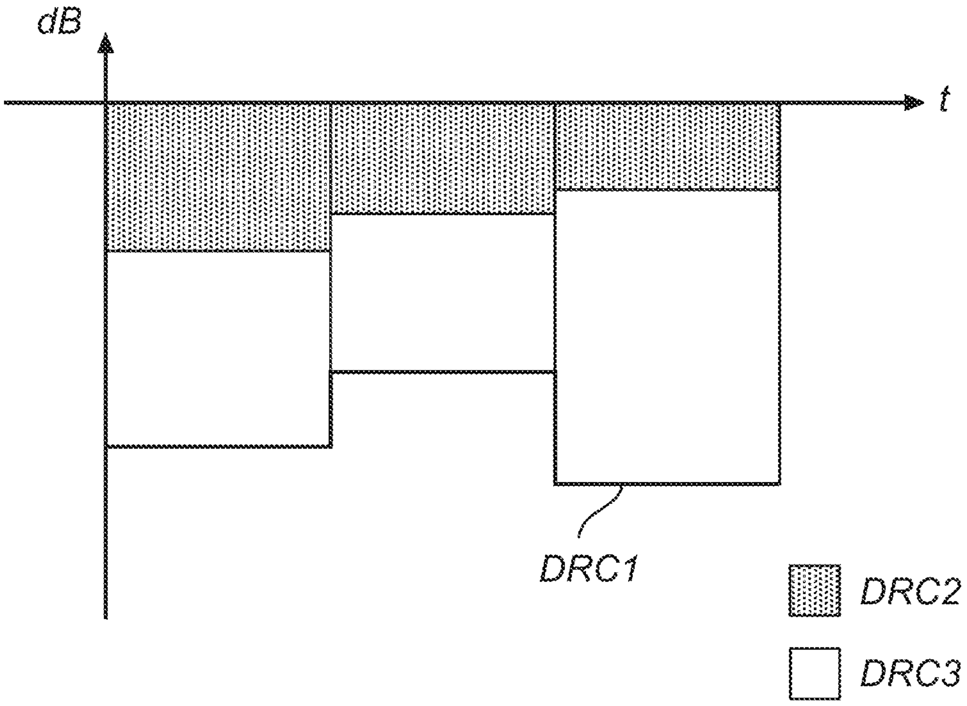
FIG. 8 illustrates computation of compensated post-processing DRC parameter values on the basis of pre-processing and post-processing DRC parameters referring to time blocks of equal lengths.
Figure 9:
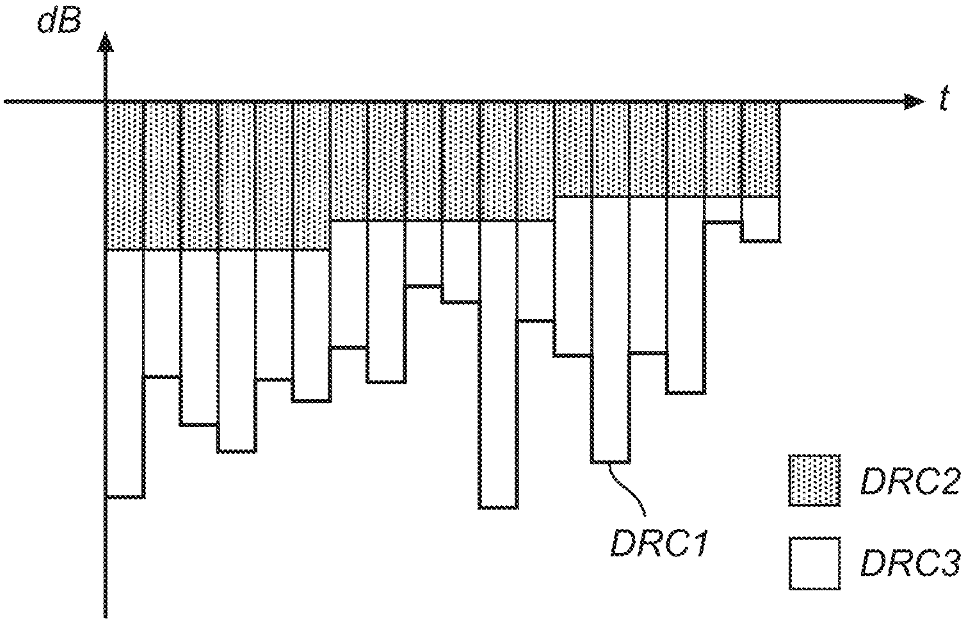
FIG. 9 illustrates computation of compensated post-processing DRC parameter values on the basis of pre-processing and post-processing DRC parameters referring to time blocks of different lengths.

FIG. 8 illustrates in greater detail a possible functioning of the DRC up-compensators 24, 724 in FIGS. 1 and 7. Each of the DRC up-compensators 24, 724 is configured to produce compensated post-processing DRC parameters DRC3 based on the pre-processing DRC parameters DRC2 and the post-processing DRC parameters DRC1. Each bar refers to a time frame of the signal. Each time frame is associated with a value of the pre-processing DRC parameters DRC2 and a value of the post-processing DRC parameters DRC1; in FIGS. 8 and 9, they may be in $dB_{FS}$ units with negative sign. As the legent indicates, the solid lines illustrates the post-processing DRC parameters DRC1, while the two other DRC parameter types correspond to different hatching patterns. Each value of the compensated post-processing DRC parameters DRC3 is produced based on the condition that the combined action of the pre-processing DRC parameters DRC2 and the compensated post-processing DRC parameters DRC3 is quantitatively equivalent to the decoder-side DRC expressed by the post-processing DRC parameters DRC1. FIGS. 8 and 9 are simplified insofar as the effect of DRC according to a particular approach (cf. the paper by Carroll and Riedmiller cited above) may not be faithfully illustrated by a scalar, linear quantity. FIGS. 8 and 9 probably convey a fairly complete picture of the simplified embodiment discussed above, wherein the DRC parameters are encoded as scalars.

FIG. 8 illustrates a situation in which the post-processing DRC parameters DRC1 are constant within each time frame, similarly to the compr parameter in the DD+ format, as explained above. This need not always be the case. For instance, a DRC analyzer of a legacy type may be configured to analyze a segment of a fixed number of $p_1$ time blocks, wherein $p_1$ may be equal to 4, 6, 8, 16, 24, 32, 64 or some other integer significantly less than the number of time blocks that are typically present in an entire program (e.g., a song, a track, an episode of a radio show). This number $p_1$ may or may not match the number $p_2$ of frames between each update of the pre-processing DRC parameters. FIG. 8 refers to the particular case where $p_1=6$ and $p_2=6$. Preferably, the number $p_1$ is small enough that the post-processing DRC parameters DRC1 are re-evaluated at least once per second of the audio signal X, more preferably several tens or hundreds of times per second of the audio signal X.

FIG. 9 shows a use case where $p_1=1$, similarly to the dynrng parameter in the DD+ format. However, the dynamic range limiting in the parametric analysis stage 22, 722 is performed based on $p_2=6$ time blocks at a time, so that consequently a new value of the pre-processing DRC parameters DRC2 is produced for every sixth time block. Each of the narrowest bars represents a time block. The up-compensators 24, 724 may be configured to determine each value of the compensated post-processing DRC parameters DRC3 in such manner that the decoder-side DRC expressed by the post-processing DRC parameters DRC1 is quantitatively equivalent to the combination of the dynamic range limiting applied by the respective parametric analysis stage 22, 722 over each time block and the decoder-side DRC quantified by the compensated post-processing DRC parameters DRC3.

III. Example Embodiments: Decoder Side

Figure 2A:
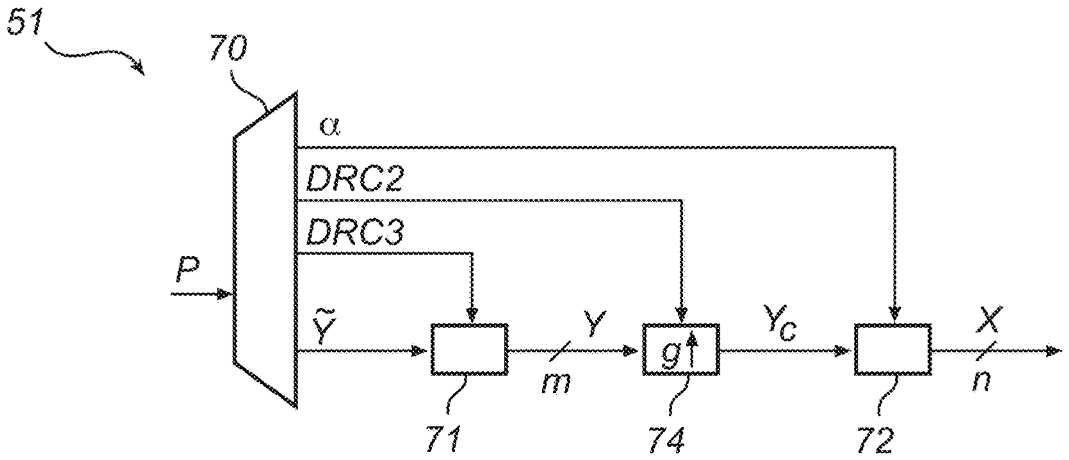
FIGS. 2A, 2B, 2C, 4, 6 and 13 are generalized block diagrams of audio decoding systems according to example embodiments of the invention.

FIG. 2*a* shows a single-mode decoding system 51 reconstructing an n-channel audio signal on the basis of a bitstream P. The bitstream P contains an encoded core signal Ỹ, multichannel coding parameters α, pre-processing DRC parameters DRC2 and compensated post-processing DRC parameters DRC3, these quantities being extracted from the bitstream by a demultiplexer 70 arranged at the input of the decoding system 51. A core signal decoder 71 receives the encoded core signal Ŷ and outputs, based thereon, an m-channel core signal Y (1≤m<n). In connection with the decoding, the core signal decoder 71 further performs DRC as quantified by the compensated post-processing DRC parameters DRC3. The core signal decoder 71 may be operable to effectuate the full DRC expressed by the compensated post-processing DRC parameters DRC3 or a fraction thereof; this decision may be manually controllable by a user or may be based on detection of properties of playback equipment. Downstream of the core signal decoder 71, there is arranged a DRC processor 74, which restores the dynamic range of the core signal, as the notation g↑ suggests, by cancelling the dynamic range limiting imposed on the encoder side, as quantified by the pre-processing DRC parameters DRC2. The DRC processor 74 outputs an intermediate signal $Y_C$, which is equivalent to the core signal Y except regarding its dynamic range and which is input to a parametric synthesis stage 72. The parametric synthesis stage 72 forms an n-channel linear combination of the m channels in the intermediate signal $Y_C$, wherein the gains applied are controllable by the multichannel coding parameters α, and outputs a reconstructed n-channel audio signal X. The linear combination in the parametric synthesis stage 72 may further include a decorrelated signal derived from the intermediate signal $Y_C$ or the core signal Y. The decorrelated signal may additionally undergo non-linear processing, such as artefact attenuation. The decorrelated signal may be produced in a core signal modifying unit or a decorrelator (not shown). In the simple embodiment outlined in passages above, the cancellation in the DRC processor 74 of the dynamic range limiting imposed on the encoder side may amount to scaling the signal in a broad-spectrum fashion by a factor corresponding to the inverse of the parameter DRC2, which quantifies the pre-processing range limiting.

Figure 2B:
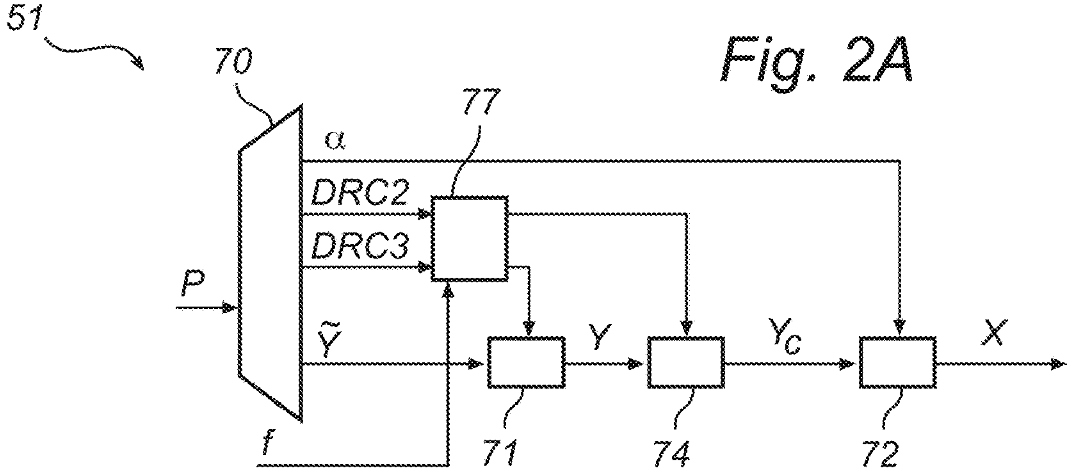

FIG. 2*b* shows a decoding system 51, which is somewhat more evolved than the one in FIG. 2*a*. The present decoding system 51, there is provided a DRC pre-processor 77, which coordinates the DRC-related action of the core signal decoder 71 and the DRC processor 74, respectively. On the one hand, the core signal decoder 71 is operable to compress the dynamic range of the signal, up to the limit defined by the compensated post-processing DRC parameters DRC3, or to compress the dynamic range. On the other hand, the DRC processor 74 is operable to boost the dynamic range completely, up to the level it had before encoding, or just partially. With this setup, it is typically possible to achieve a given target DRC level by activating DRC processing in only one of the core signal decoder 71 and the DRC processor 74. If the compensated post-processing DRC parameters DRC3 indicates a dynamic range compression, then operating both units at the same time may imply some degree of mutual counter-action (mutual cancellation), which could impact the output quality in a negative way.

The DRC pre-processor 77 receives both the pre-processing DRC parameters DRC2 and the compensated post-processing DRC parameters DRC3. The DRC pre-processor 77 further has access to a pre-defined or variable (e.g., user-defined) DRC target level, which is expressed by a parameter f, e.g., f×DRC1, and an input DRC level of the signal corresponding to the original dynamic ranged reduced by DRC2. The DRC pre-processor 77 decides, based on a comparison of the two DRC levels, whether the DRC target level is to be achieved by dynamic range compression in the core signal decoder 71 or dynamic range boosting in the DRC processor 74. For this purpose, the DRC pre-processor 77 outputs dedicated control signals $k_{71}$, $k_{74}$, which are supplied to each of the core signal decoder 71 and the DRC processor 74.

The behaviour of control signals $k_{71}$, $k_{74}$ to be supplied from the DRC pre-processor 77 to the core signal decoder 71 and the DRC processor 74, respectively, will now be discussed. The first control signal $k_{71}$ controls what fraction of the decoder-side DRC, as quantified by the compensated post-processing DRC parameters DRC3, is to be applied by the core signal decoder 71. In the simple embodiment discussed previously, the resulting relative gain changes is given by the factor $$10^{-\frac{k_{71}DRC3}{20}},$$

so that the maximal value $k_{71}=1$ corresponds to maximal dynamic range compression, while the minimal signal value corresponds to absence of dynamic range compression The second control signal $k_{74}$ controls the extent to which the DRC processor 74 is to cancel the encoder-side dynamic range limitation. In the simple embodiment discussed above, the DRC 74 changes the gain by the factor $$10^{\frac{k_{74}DRC2}{20}},$$

wherein the minimal value $k_{74}=0$ corresponds to no cancellation and the maximal value corresponds to complete cancellation, restoring the signal to 100% of its original dynamic range. The DRC pre-processor 77 may be configured to execute a target DRC level differently depending on whether it corresponds to a dynamic range boost or a dynamic range compression in relation to the input DRC level, to be understood as the original dynamic range reduced (or compressed) by an amount DRC2. Furthermore, the DRC pre-processor 77 may be configured to interpolate between the minimal and maximal values in order to achieve a target DRC level which corresponds to a fraction of the pre-processing DRC parameters DRC2 or the compensated post-processing DRC parameters DRC3. Interpolation may also be used to achieve a target DRC level which is expressed as a fraction of the non-compensated post-processing DRC parameters DRC1. Each of the fractions of DRC2 and DRC3 can be computed based on the parameters f and DRC1, see below. It will now be described, in the context of said simple embodiment, how the DRC pre-processor 77 may respond to a particular target DRC level expressed as a fraction f of the post-processing DRC parameters DRC1. In view of the discussion in the preceding paragraph, the DRC pre-processor 77 is to assign values in [0,1] to the parameters $k_{71}$, $k_{74}$ in the equation $$f \times DRC1 = k_{74} \times DRC2 + k_{71} \times DRC3,$$

where $f \in [0, 1]$ is predefined, DRC2≥0 and DRC1=DRC2+DRC3 (logarithmic scale). It follows from the above that DRC1 and DRC3 may be positive or negative. As noted above, it is generally desirable to avoid operating both the core signal decoder 71 and the DRC processor 74 at the same time if the action of the core signal decoder 71 is range compacting (DRC3=y>0). This amounts to solving the above equation for $k_{71}=0$ or $k_{74}=0$.

A further possible representation is a loudness-dependent gain factor, possibly on a logarithmic scale. For instance, a pair of gain factors may be transmitted together with a dialogue level. A first gain factor is to be applied in time segments louder than the dialogue level, whereas the second gain factor is to be applied in time segments that are quieter. This enables dynamic range compression and extension, since the first and second gain factors can be assigned mutually independent values.

Figure 2C:
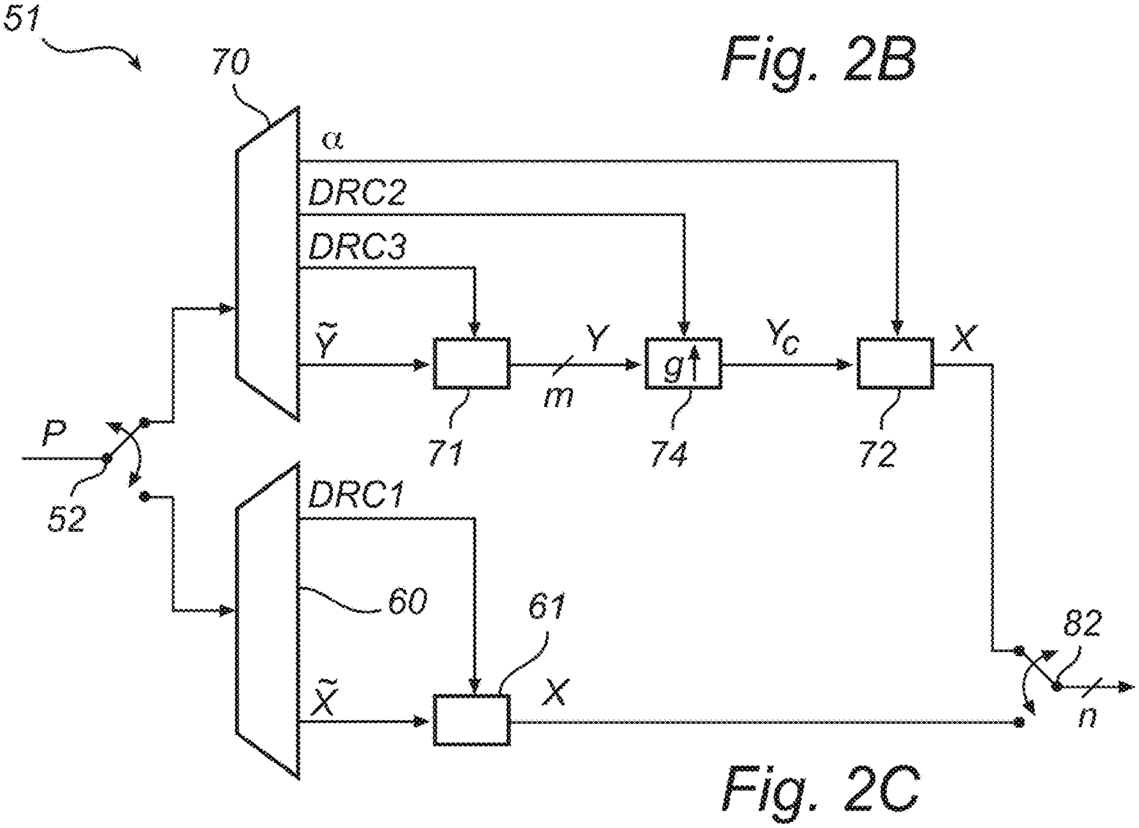

FIG. 2*c* shows a dual-mode decoding system 51, which is configured to receive a bitstream P containing an audio signal that is either parametrically coded or discretely coded. In the parametric mode of the decoding system 51, an upper portion downstream of a parametric-mode demultiplexer 70 is active to provide, similarly to the functioning of the system shown in FIG. 2*a*, an n-channel audio signal X. In the discrete mode, the bitstream P is supplied to a discrete-mode demultiplexer 60, which extracts an encoded n-channel signal $\tilde{X}$ and one or more post-processing DRC parameters DRC1. Selectors 52, 82 (symbolizing any hardware- or software-implemented signal selection means) at the input and output sides of the decoding system 51 are operated in accordance with a current mode; the selectors may be operated jointly, so that both are always in either their upper positions or their lower positions. In the discrete mode, the encoded n-channel signal $\tilde{X}$ is processed by a decoder 61, which is operable to execute DRC in accordance with the post-processing DRC parameters DRC1. Consistency in the dialogue level between the discrete and the parametric coding modes is ensured by the fact that the decoding system 51 is configured to use the compensated post-processing DRC parameters DRC3 in the place of the (non-compensated) post-processing DRC parameters DRC1 in the parametric mode. The relationship between the parameters DRC1 and DRC3 has been discussed previously.

Figure 4:
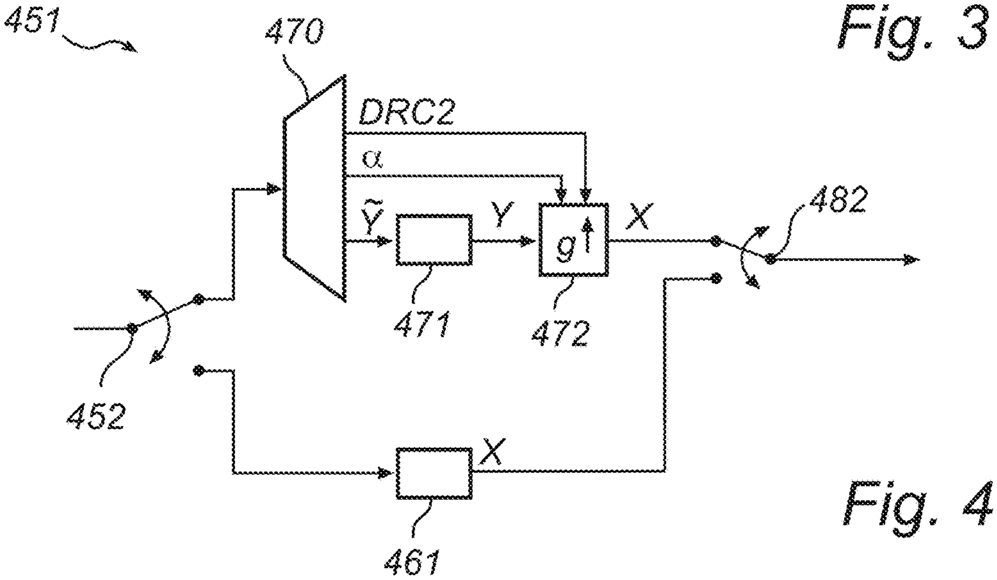

FIG. 4 is a generalized block diagram of a simplified decoding system 451, which lacks the ability of performing post-processing DRC. However, the decoding system 451 in FIG. 4 is operable to cancel the dynamic range limiting applied on the encoder side, as quantified by the pre-processing DRC parameters DRC2. More precisely, a parametric synthesis stage 472 is configured to completely or partially cancel this dynamic range limiting, as indicated by the symbol g↑.

Figure 11:
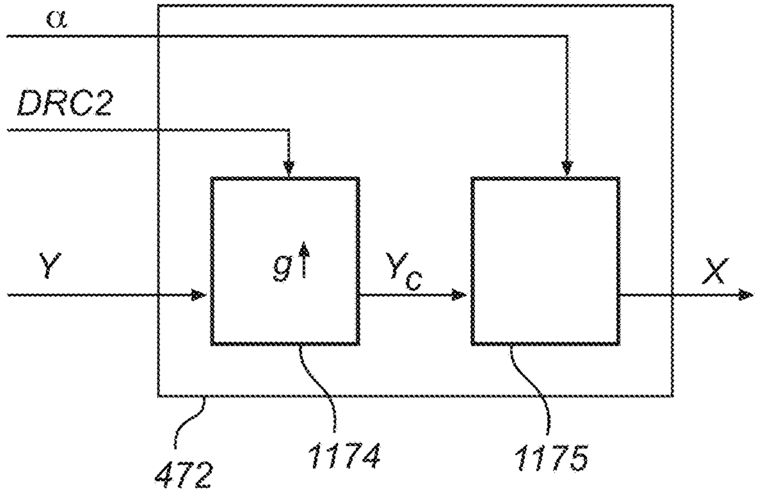
FIGS. 11 and 12 shows a portion of a parametric synthesis stage in an audio decoding system.
Figure 12:
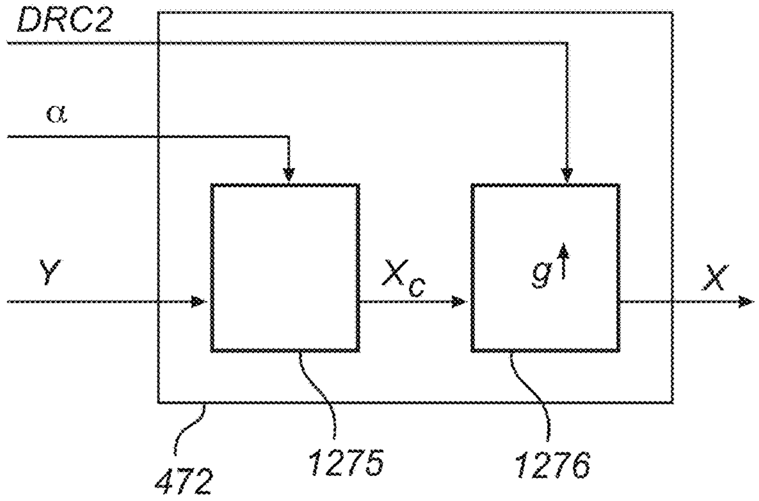

FIGS. 11 and 12 show two possible implementations of the parametric synthesis stage 472 appearing in FIG. 4. Similar implementations are useful as well in an encoding system of the type shown in FIG. 13, which is discussed further below. In a first possible implementation, as shown in FIG. 11, a pre-conditioner 1174 performs dynamic range limiting cancellation on the m-channel core signal Y, whereby an m-channel intermediate signal $Y_C$ is obtained. The intermediate signal $Y_C$ is then processed in a parametric synthesis processor 1175, which forms a linear combination of the channels in the intermediate signal $Y_C$ (and possibly, an additional, decorrelated signal), wherein the gains applied within the linear combination are controllable by way of multichannel coding parameters α, which are also supplied to the parametric synthesis processor 1175.

The second implementation shown in FIG. 12 represents an alternative to this. In the second implementation, the parametric synthesis precedes the dynamic range limiting cancellation as processing steps. This fact manifests itself in that the parametric synthesis processor 1275 is arranged upstream of a post-conditioner 1276. It is the post-conditioner 1276 that is responsible for cancelling the encoder-side dynamic range limiting, as quantified by the pre-processing DRC parameters DRC2. Hence, the signal supplied from the parametric synthesis processor 1275 to the post-conditioner 1276 relates to a dynamic range limited n-channel signal $X_C$.

Figure 13:
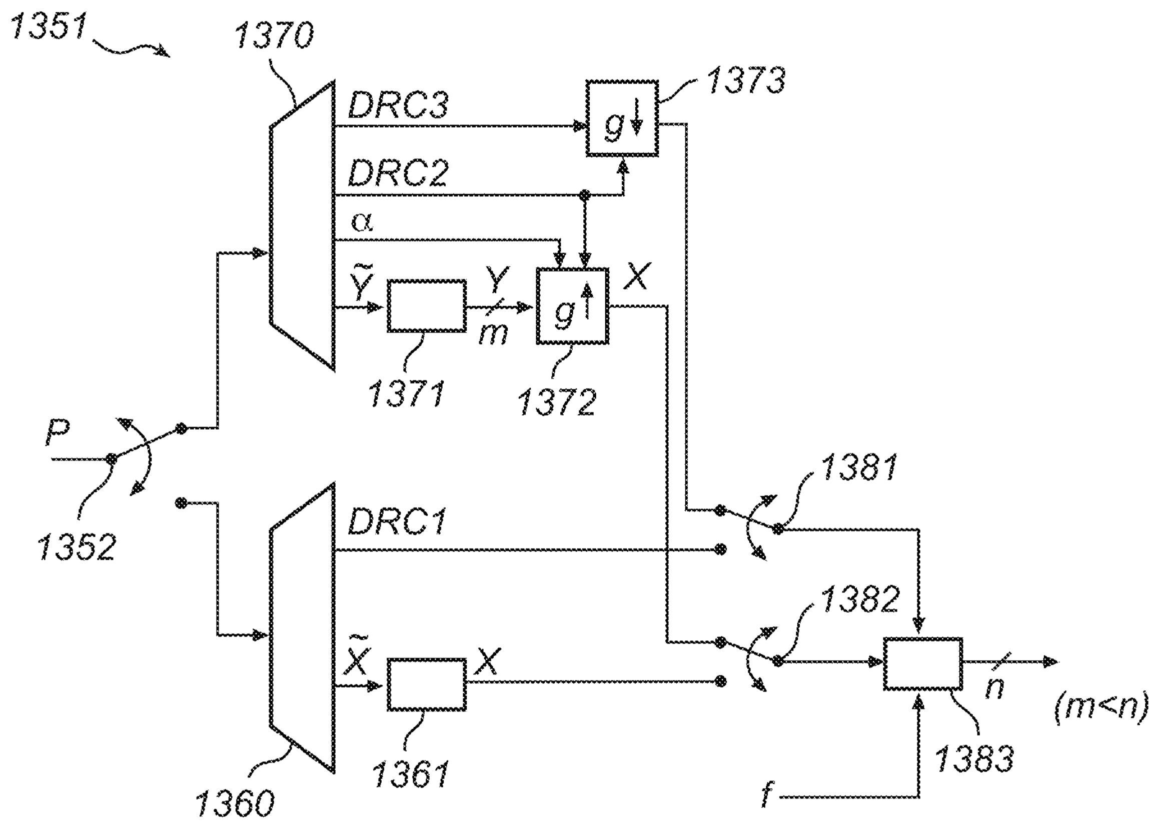

FIG. 13 shows, according to a still further example embodiment, a decoding system 1351, in which decoder-side DRC is effected by a DRC processor 1383 arranged downstream of both a discrete-mode portion and a parametric-mode portion of the system 1351. As in the decoding systems that have been described with reference to FIGS. 2*a*, 2*b*, 2*c* and 4, the present decoding system 1351 is also capable to cancel any dynamic range limiting having been applied on the encoder side, as quantified by pre-processing DRC parameters DRC2. The DRC processor 1383 is intended to function both in the discrete coding mode, wherein (non-compensated) post-processing DRC parameters DRC1 are contained in the received bitstream P, and in the parametric coding mode, wherein compensated post-processing DRC parameters DRC3 are received. It is noted that the decoding system 1351 differs from the system 51 shown in FIG. 2*b* insofar as the post-processing DRC is effected on the n-channel output signal, i.e., downstream of the parametric synthesis stage 1372. In the system 51 of FIG. 2*b*, the corresponding operation takes place in the core signal decoder 71.

The DRC processor 1383 receives a target DRC level f from a user, a memory, a hardware diagnosis performed on the playback equipment, or some other external or internal data source. For example, the target DRC level f may represent the fraction of the full post-processing DRC that the user wishes to be effected by the decoding system 1351. As will be seen, the structure of the decoding system 1351 has the advantage that only the DRC processor 1383 is required to take the value of parameter f into account; this makes the implementation of fractional DRC convenient. For this purpose, there is provided a DRC down-compensator 1373 configured to convert the compensated post-processing DRC parameters DRC3 to the scale of the (non-compensated) post-processing DRC parameters DRC1. Indeed, the n-channel audio signal X which is output from the parametric synthesis stage 1372 will have undergone cancellation of the encoder-side dynamic range limiting; hence, applying DRC in accordance with the compensated post-processing DRC parameters DRC3 would have entailed an overly small range compression. To forestall this scenario, the DRC down-compensator 1373 restores the compensated post-processing DRC parameters DRC3 based on the pre-processing DRC parameters DRC2, whereby restored post-processing DRC parameters are obtained and supplied, in the parametric coding mode, to the DRC processor 1383. As already noted, the decoder-side DRC expressed by the restored DRC parameters is quantitatively equivalent to the combination of the encoder-side dynamic range limiting, having already been imposed on the core signal, and the decoder-side DRC expressed by the compensated post-processing DRC parameters DRC3, as suggested by FIGS. 8 and 9.

In an alternative embodiment, the decoding system 1351 may be implemented without a discrete-mode demultiplexer 1360 and decoder 1361. The DRC parameter selectors 1381, 1382 in FIG. 13 are then replaced by connections between the DRC processor 1383 and each of the DRC down-compensator 1373, from which the restored post-processing DRC parameters are received, and the parametric synthesis stage 1372, which supplies the n-channel audio signal X. This alternative embodiment is simplified insofar as it operates in a single, parametric decoding mode. Further, it may be simpler to implement because a legacy-type DRC processor 1383, which is not necessarily configured to handle compensated post-processing DRC parameters, can be used.

Figure 6:
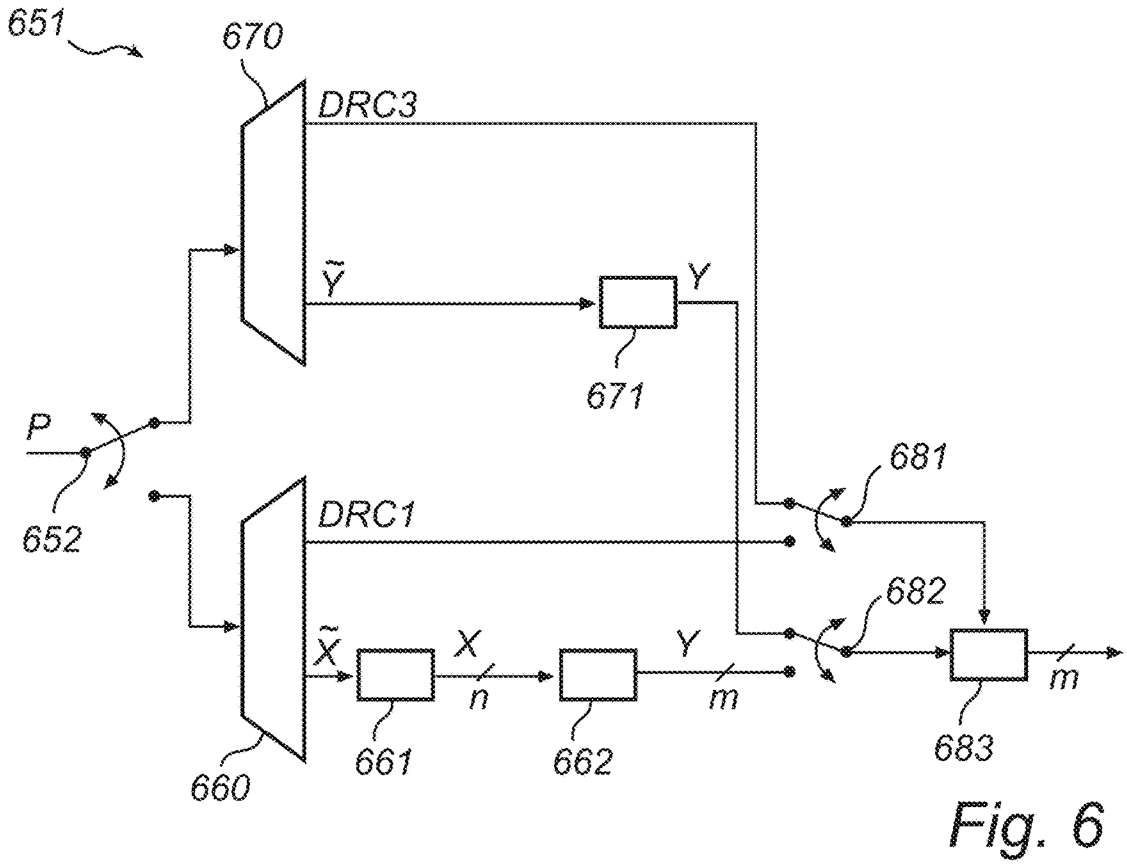

FIG. 6 shows a legacy decoding system 651 for decoding a received bitstream P into an m-channel audio signal. In parametric coding mode, an upper portion, located downstream of the parametric-mode demultiplexer 670, is active, outputting an encoded m-channel core signal $\tilde{Y}$ as well as compensated post-processing DRC parameters DRC3. The encoded m-channel core signal $\tilde{Y}$ is decoded by a first decoder 671 into an m-channel core signal Y. In discrete coding mode, the audio signal to be output is produced by a lower portion, located downstream of a discrete-mode demultiplexer 660, which extracts from the bitstream P an encoded n-channel signal $\tilde{X}$ as well as (non-compensated) post-processing DRC parameters DRC1. The encoded n-channel signal $\tilde{X}$ is decoded by a second decoder 661 and then undergoes downmixing, in a downmix stage 662, into an m-channel signal Y. Both this signal Y and the signal Y mentioned in connection with the parametric mode is supplied to a DRC processor 683 common to both modes. In the parametric mode, the quantitative properties of the DRC processor 683 are controlled by the compensated post-processing DRC parameters DRC3, whereas in the discrete mode, these properties are controlled by the (non-compensated) post-processing DRC parameters DRC1. This way, it is possible to maintain a consistent dialogue level of the m-channel audio signal which is output from the decoding system 651. It is noted that the present decoding system 651 may be of legacy type, since it may treat the compensated and non-compensated post-processing DRC parameters in a similar, if not identical, manner.

IV. Reference Symbols in the Drawings

1, 301, 701, 1051 encoding system
10, 710 DRC analyzer
11, 311, 711 encoder
12, 712 discrete-mode multiplexer
21, 721 DRC analyzer
22, 322, 722, 1022 parametric analysis stage
23, 323, 723 core signal encoder
24, 724 DRC up-compensator
25, 325, 725, 1025 parametric-mode multiplexer
26, 326, 726, 1026 selector
527 pre-processor
528 parametric analysis processor
51, 451, 651, 1351 decoding system
452, 652, 1352 selector
60, 660, 1360 demultiplexer
61, 461, 1361 decoder
661 second decoder
662 downmix stage
70, 470, 670, 1370 demultiplexer
71, 471, 1371 core signal decoder
671 first decoder
72, 472, 1372 parametric synthesis stage
1373 DRC down-compensator
74 DRC processor
1174 pre-conditioner
1175, 1275 parametric synthesis processor
1276 post-conditioner
77 DRC pre-processor
681, 1381 DRC parameter selector
482, 682, 1382 signal selector
683, 1383 DRC processor
X ($\tilde{X}$) n-channel signal (encoded n-channel signal)
$X_c$ dynamic range limited n-channel signal
Y ($\tilde{Y}$) m-channel signal (encoded n-channel signal), $1 \le m < n$
$Y_C$ intermediate signal
f parameter indicating a fraction of a specified DRC to be applied
g dynamic range limiting amount
$\alpha$ multichannel coding parameter(s)
DRC1 (restored) post-processing DRC parameters
DRC2 pre-processing DRC parameters
DRC3 compensated post-processing DRC parameters
P bitstream V. Equivalents, Extensions, Alternatives and Miscellaneous Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

What is claimed is:

1. A method, performed by an audio signal processing device, for adjusting a dynamic range of an audio signal, the method comprising:

receiving a bitstream comprising an encoded audio signal, encoder-generated loudness metadata, and encoder-generated dynamic range control (DRC) metadata, wherein the encoder-generated loudness metadata comprises a loudness level of the audio signal, and wherein the encoder-generated DRC metadata comprises a plurality of DRC gain sets, the plurality of DRC gain sets comprising a first set of DRC gains representing a first portion of a total DRC gain to be applied to the audio signal to adjust the dynamic range of the audio signal, and a second set of DRC gains representing a second portion of the total DRC gain to be applied to the audio signal to adjust the dynamic range of the audio signal;

decoding the encoded audio signal to obtain the audio signal;

adjusting the dynamic range of the audio signal by applying the first set of DRC gains and the second set of DRC gains to the audio signal to apply the total DRC gain to be applied to the audio signal; and adjusting the loudness of the audio signal by applying a gain determined in response to the loudness level of the audio signal and a target output level;

wherein at least one of the first set of DRC gains and the second set of DRC gains are broadband gains.

2. An audio signal processing device for adjusting a dynamic range of an audio signal, the audio signal processing device comprising one or more processors that:

receive a bitstream comprising an encoded audio signal, encoder generated loudness metadata, and encoder-generated dynamic range control (DRC) metadata, wherein the encoder-generated loudness metadata comprises a loudness level of the audio signal, and wherein the encoder-generated DRC metadata comprises a plurality of DRC gain sets, the plurality of DRC gain sets comprising a first set of DRC gains representing a first portion of a total DRC gain to be applied to the audio signal to adjust the dynamic range of the audio signal, and a second set of DRC gains representing a second portion of the total DRC gain to be applied to the audio signal to adjust the dynamic range of the audio signal;

decode the encoded audio signal to obtain the audio signal; and adjust the dynamic range of the audio signal by applying the first set of DRC gains and the second set of DRC gains to the audio signal to apply the total DRC gain to be applied to the audio signal; and adjust the loudness of the audio signal by applying a gain determined in response to the loudness level of the audio signal and a target output level;

wherein at least one of the first set of DRC gains and the second set of DRC gains are broadband gains.

3. A non-transitory computer readable storage medium comprising software instructions, which, when executed by an audio signal processing device, cause the audio signal processing device to perform a method for adjusting a dynamic range of an audio signal, the method comprising:

receiving a bitstream comprising an encoded audio signal, encoder-generated loudness metadata, and encoder-generated dynamic range control (DRC) metadata, wherein the encoder-generated loudness metadata comprises a loudness level of the audio signal, and wherein the encoder-generated DRC metadata comprises a plurality of DRC gain sets, the plurality of DRC gain sets comprising a first set of DRC gains representing a first portion of a total DRC gain to be applied to the audio signal to adjust the dynamic range of the audio signal, and a second set of DRC gains representing a second portion of the total DRC gain to be applied to the audio signal to adjust the dynamic range of the audio signal;

decoding the encoded audio signal to obtain the audio signal; and adjusting the dynamic range of the audio signal by applying the first set of DRC gains and the second set of DRC gains to the audio signal to apply the total DRC gain to be applied to the audio signal; and adjusting the loudness of the audio signal by applying a gain determined in response to the loudness level of the audio signal and a target output level;

wherein at least one of the first set of DRC gains and the second set of DRC gains are broadband gains.

* * * * *